(12) United States Patent
Lee et al.

(10) Patent No.: US 9,435,414 B2
(45) Date of Patent: Sep. 6, 2016

(54) PLANETARY GEAR TRAIN OF AUTOMATIC TRANSMISSION FOR VEHICLES

(71) Applicant: Hyundai Motor Company, Seoul (KR)

(72) Inventors: Changwook Lee, Suwon-Si (KR);
Jaechang Kook, Hwaseong-Si (KR);
Jongsool Park, Hwaseong-Si (KR);
Kangsoo Seo, Yongin-Si (KR);
Donghwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/557,270

(22) Filed: Dec. 1, 2014

(65) Prior Publication Data

US 2016/0010733 A1 Jan. 14, 2016

(30) Foreign Application Priority Data

Jul. 9, 2014 (KR) .................. 10-2014-0086074

(51) Int. Cl.
*F16H 3/66* (2006.01)
*F16H 37/04* (2006.01)

(52) U.S. Cl.
CPC .............. *F16H 37/042* (2013.01); *F16H 3/66* (2013.01); *F16H 3/666* (2013.01); *F16H 2200/0065* (2013.01); *F16H 2200/0082* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| 8,083,633 | B2 | 12/2011 | Wittkopp et al. | |
|---|---|---|---|---|
| 8,100,801 | B2 | 1/2012 | Wittkopp et al. | |
| 2014/0113765 | A1* | 4/2014 | Noh | F16H 3/62 475/302 |
| 2014/0162831 | A1* | 6/2014 | Lee | F16H 3/66 475/284 |
| 2014/0162832 | A1* | 6/2014 | Noh | F16H 3/666 475/311 |

FOREIGN PATENT DOCUMENTS

| JP | 2010-007709 A | 1/2010 |
|---|---|---|
| KR | 10-1063500 B1 | 9/2011 |
| KR | 10-1371473 B1 | 3/2014 |

* cited by examiner

*Primary Examiner* — Edwin A Young

(74) *Attorney, Agent, or Firm* — Morgan, Lewis & Bockius LLP

(57) ABSTRACT

A planetary gear train of an automatic transmission for a vehicle may include an input shaft, an output shaft, three planetary gear sets, three transfer gears, and six friction elements. Each of the three planetary gear sets may include three rotation elements, constituting nine rotational elements. The rotational elements may be connected or selectively connected to the input shaft, a transmission housing or each other by an external gear or by the six friction elements. The three transfer gears may be applied to the external gear.

11 Claims, 6 Drawing Sheets

FIG. 2

|  | C1 | C2 | C3 | C4 | B1 | B2 | GEAR RATIO | INTER-STAGE RATIO |
|---|---|---|---|---|---|---|---|---|
| 1st |  |  |  |  | ● | ● | 4.109 | 1.6164 |
| 2nd |  |  |  | ● |  | ● | 2.542 | 1.3982 |
| 3rd | ● |  |  |  |  | ● | 1.818 | 1.3212 |
| 4th |  | ● |  |  |  | ● | 1.376 | 1.3733 |
| 5th | ● | ● |  |  |  |  | 1.002 | 1.27 |
| 6th |  | ● |  | ● |  |  | 0.789 | 1.3041 |
| 7th |  | ● | ● |  |  |  | 0.605 | 1.1437 |
| 8th |  |  | ● | ● |  |  | 0.529 | 1.0998 |
| 9th | ● |  | ● |  |  |  | 0.481 |  |
| REV | ● |  |  |  | ● |  | -4.385 |  |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2014-0086074 filed on Jul. 9, 2014, the entire contents of which are incorporated herein for all purposes by this reference.

BACKGROUND OF THE INVENTION

1. Field of the Invention

The present invention relates to an automatic transmission for vehicles, and more particularly, to a planetary gear train of an automatic transmission for vehicles capable of reducing the whole length to improve mounting property and improving power transfer performance to reduce fuel costs.

2. Description of the Related Art

Typically, a multi-level transmission mechanism of an automatic transmission is implemented by a combination of a plurality of planetary gear sets and friction elements, and since the more the implementable shift stages are, the more possible a design of more proper shift ratios and an excellent vehicle in the light of power performance and fuel efficiency may be implemented, an untiring research into a planetary gear train for an automatic transmission capable of implementing more shift stages has been made.

Since the above-mentioned planetary gear train has different durability, power transfer efficiencies, sizes, or the like depending on a connection structure of rotation elements (a sun gear, a planetary gear, a ring gear, etc) even though it implements the same shift stage, research and development for manufacturing the planetary gear train which is stronger, has no power loss, and is compact have been continued.

In addition, the planetary gear train implements a plurality of shift stages, and in the light of a shift control, whether or not the planetary gear train satisfies an operation condition when performing a sequential shift as a neighboring shift stage and whether or not an inter-stage ratio between neighboring shift stages is implemented at a proper level are magnified as one of differentiated functions.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a planetary gear train of an automatic transmission for vehicles having advantages of reducing the whole length to improve mounting property and improving power transfer performance to reduce fuel costs by implementing a forward 9-speed and reverse 1-speed shift stage having an excellent operation condition of a friction element by a combination of three planetary gear sets, three external gears, and six friction elements which are distributively disposed on an input shaft and an output shaft having a predetermined distance therebetween and disposed in parallel or substantially in parallel with each other.

In addition, the present invention has been made in an effort to provide a planetary gear train of an automatic transmission for vehicles having advantages of setting an optimal gear ratio by applying a plurality of transfer gears to freely change the number of teeth of a gear and consequently, improving power transfer performance and fuel efficiency.

Various aspects of the present invention provide a planetary gear train of an automatic transmission for a vehicle including: an input shaft receiving power of an engine; an output shaft disposed in parallel with the input shaft; a first planetary gear set having three rotation elements including a first sun gear, a first planetary carrier, and a first ring gear, and disposed on the input shaft; a second planetary gear set having three rotation elements including a second sun gear, a second planetary carrier, and a second ring gear, and disposed on the output shaft; a third planetary gear set having three rotation elements including a third sun gear, a third planetary carrier, and a third ring gear, and disposed on the input shaft; three transfer gears; and six friction elements, wherein a first rotation element selectively connected to the input shaft, the first rotation element being one of the three rotation elements of the first planetary gear set; a second rotation element selectively connected to the input shaft, the second rotation element being another one of the three rotation elements of the first planetary gear set; a third rotation element being the remaining one of the three rotation elements of the first planetary gear set; a fourth rotation element connected to the second rotation element by an external gear and selectively connected to a transmission housing, the fourth rotation element being one of the three rotation elements of the second planetary gear set; a fifth rotation element connected to the third rotation element by the external gear and directly connected to the output shaft at the same time, and selectively connected to the fourth rotation element, the fifth rotation element being another one of the three rotation elements of the second planetary gear set; a sixth rotation element being the remaining one of the three rotation elements of the second planetary gear set; a seventh rotation element directly connected to the input shaft, the seventh rotation element being one of the three rotation elements of the third planetary gear set; an eighth rotation element selectively connected to the input shaft and connected to the sixth rotation element by the external gear at the same time, the eighth rotation element being another one of the three rotation elements of the third planetary gear set; a ninth rotation element selectively connected to the transmission housing, the ninth rotation element being the remaining one of the three rotation elements of the third planetary gear set; the three transfer gears are applied to the external gear; and a respective friction element in the six friction elements selectively connects two corresponding rotation elements to each other or selectively connects a corresponding rotation element to the transmission housing.

Each of the first, second, and third planetary gear sets may be a single pinion planetary gear set, the first rotation element may include the first sun gear, the second rotation element may include the first planetary carrier, the third rotation element includes the first ring gear, the fourth rotation element may include the second sun gear, the fifth rotation element may include the second planetary carrier, the sixth rotation element may include the second ring gear, the seventh rotation element may include the third sun gear, the eighth rotation element may include the third planetary carrier, and the ninth rotation element may include the third ring gear.

The three transfer gears may include a first transfer gear disposed between the second rotation element and the fourth rotation element; a second transfer gear disposed between the third rotation element and the fifth rotation element; and a third transfer gear disposed between the sixth rotation element and the eighth rotation element.

The six friction elements may include a first clutch disposed between the input shaft and the first rotation element; a second clutch disposed between the input shaft and the second rotation element; a third clutch disposed between the input shaft and the eighth rotation element; a fourth clutch disposed between the fourth rotation element and the fifth rotation element; a first brake disposed between the fourth rotation element and the transmission housing; and a second brake disposed between the ninth rotation element and the transmission housing.

A shift stage implemented by simultaneously engaging two friction elements of the six friction elements may include a forward 1-speed shift stage in which the first and second brakes are simultaneously operated; a forward 2-speed shift stage in which the fourth clutch and the second brake are simultaneously operated; a forward 3-speed shift stage in which the first clutch and the second brake are simultaneously operated; a forward 4-speed shift stage in which the second clutch and the second brake are simultaneously operated; a forward 5-speed shift stage in which the first and second clutches are simultaneously operated; a forward 6-speed shift stage in which the second and fourth clutches are simultaneously operated; a forward 7-speed shift stage in which the second and third clutches are simultaneously operated; a forward 8-speed shift stage in which the third and fourth clutches are simultaneously operated; a forward 9-speed shift stage in which the first and third clutches are simultaneously operated; and a reverse shift stage in which the first clutch and the first brake are simultaneously operated.

The first planetary gear set may be a double pinion planetary gear set, each of the second and third planetary gear sets may be a single pinion planetary gear set, the first rotation element may include the first sun gear, the second rotation element may include the first ring gear, the third rotation element may include the first planetary carrier, the fourth rotation element may include the second sun gear, the fifth rotation element may include the second planetary carrier, the sixth rotation element may include the second ring gear, the seventh rotation element may include the third sun gear, the eighth rotation element may include the third planetary carrier, and the ninth rotation element may include the third ring gear.

Each of the first and third planetary gear sets may be a single pinion planetary gear set, the second planetary gear set may be a double pinion planetary gear set, the first rotation element may include the first sun gear, the second rotation element may include the first planetary carrier, the third rotation element may include the first ring gear, the fourth rotation element may include the second sun gear, the fifth rotation element may include the second ring gear, the sixth rotation element may include the second planetary carrier, the seventh rotation element may include the third sun gear, the eighth rotation element may include the third planetary carrier, and the ninth rotation element may include the third ring gear.

Each of the first and second planetary gear sets may be a single pinion planetary gear set, the third planetary gear set may be a double pinion planetary gear set, the first rotation element may include the first sun gear, the second rotation element may include the first planetary carrier, the third rotation element may include the first ring gear, the fourth rotation element may include the second sun gear, the fifth rotation element may include the second planetary carrier, the sixth rotation element may include the second ring gear, the seventh rotation element may include the third sun gear, the eighth rotation element may include the third ring gear, and the ninth rotation element may include the third planetary carrier.

The six friction elements may include a first clutch disposed between the input shaft and the first rotation element; a second clutch disposed between the input shaft and the second rotation element; a third clutch disposed between the input shaft and the eighth rotation element; a fourth clutch disposed between the fourth rotation element and the fifth rotation element; a first brake disposed between the second rotation element and the transmission housing; and a second brake disposed between the ninth rotation element and the transmission housing.

According to various aspects of the present invention, the three planetary gear sets are distributively disposed on the input shaft and the output shaft which are disposed to have the predetermined distance therebetween and be in parallel with each other, whereby the whole length may be reduced, thereby improving mounting property.

In addition, according to the present invention, the optimal gear ratio for each vehicle may be set by freely changing the number of teeth of the gear by using the three external gears in addition to the planetary gear sets, and the gear change may be performed to satisfy the required performance condition to improve start performance, whereby an existing torque converter may be omitted and a start clutch may be used. In addition, according to the present invention, the transmission control may be easily performed by operating two friction elements in each shift stage.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each shift stage of each friction element which is used for the planetary gear train according to an exemplary embodiment of the present invention.

DETAILED DESCRIPTION OF THE EMBODIMENTS

Figure 1:
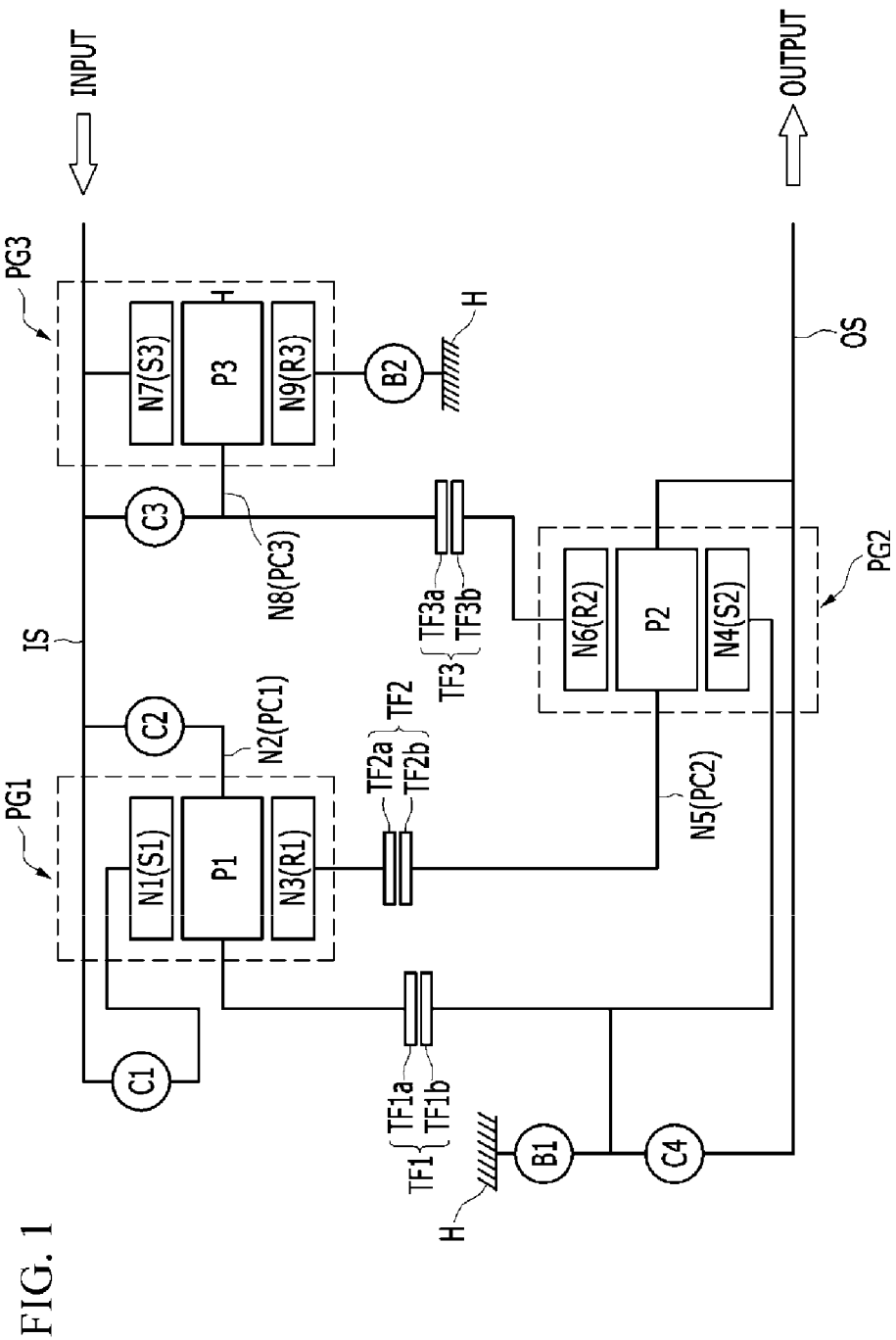
FIG. 1 is a schematic diagram of a first exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification In the following detailed description, classifying names of the configurations or elements into first, second, and the like, is to classify the configurations elements because the configurations or elements have the same or similar relationship, and the present invention is not necessarily limited to the above-mentioned order in the following detailed description.

FIG. 1 is a schematic diagram of a planetary gear train according to a first exemplary embodiment of the present invention. Referring to FIG. 1, the planetary gear train according to the first exemplary embodiment of the present invention includes first, second and third planetary gear sets PG1, PG2, and PG3, three transfer gears TF1, TF2, and TF3, and six friction elements C1, C2, C3, C4, B1, and B2.

The first and third planetary gear sets PG1 and PG3 are disposed on an input shaft IS and the second planetary gear set PG2 is disposed on an output shaft OS which is disposed in parallel or substantially in parallel with the input shaft IS while having a predetermined distance from the input shaft IS.

Accordingly, rotation power input from the input shaft IS is shifted to a forward 9-speed and reverse 1-speed by a complementary operation of the first, second, and third planetary gear sets PG1, PG2, and PG3 and is output through the output shaft OS.

The first planetary gear set PG1, which is a single pinion planetary gear set, includes a first sun gear S1 which is a first rotation element N1, a first planetary carrier PC1 which is a second rotation element N2 rotationally supporting a first pinion P1 connected to the first sun gear S1 by an external gear, and a first ring gear R1 which is a third rotation element N3 connected to the first pinion P1 by an internal gear.

The second planetary gear set PG2, which is the single pinion planetary gear set, includes a second sun gear S2 which is a fourth rotation element N4, a second planetary carrier PC2 which is a fifth rotation element N5 rotationally supporting a second pinion P2 connected to the second sun gear S2 by the external gear, and a second ring gear R2 which is a sixth rotation element N6 connected to the second pinion P2 by the internal gear.

The third planetary gear set PG3, which is the single pinion planetary gear set, includes a third sun gear S3 which is a seventh rotation element N7, a third planetary carrier PC3 which is an eighth rotation element N8 rotationally supporting a third pinion P3 connected to the third sun gear S3 by the external gear, and a third ring gear R3 which is a ninth rotation element N9 connected to the third pinion P3 by the internal gear.

In addition, the first rotation element N1 is selectively connected to the input shaft IS, the second rotation element N2 is selectively connected to the input shaft IS and is connected to the fourth rotation element N4 by the external gear at the same time, and the third rotation element N3 is connected to the fifth rotation element N5 by the external gear.

In addition, the fourth rotation element N4 is connected to the second rotation element N2 by the external gear and is selectively connected to the output shaft OS and a transmission housing H, respectively, at the same time, the fifth rotation element N5 is connected to the third rotation element N3 by the external gear and is directly connected to the output shaft OS at the same time, and the six rotation element N6 is connected to the eighth rotation element N8 by the external gear.

In addition, the seventh rotation element N7 is directly connected to the input shaft IS, the eighth rotation element N8 is connected to the sixth rotation element N6 by the external gear and is selectively connected to the input shaft IS, and the ninth rotation element N9 is selectively connected to the transmission housing H.

The three transfer gears TF1, TF2, and TF3 perform a back-lashing transfer of the rotation powers which are shifted by the first and third planetary gear sets PG1 and PG3 depending on the respective gear ratios to the second planetary gear set PG2.

The first transfer gear TF1 includes a first transfer drive gear TF1$a$ which is directly connected to the second rotation element N2, and a first transfer driven gear TF1$b$ which is directly connected to the fourth rotation element N4, and connects the second rotation element N2 and the fourth rotation element N4 to each other by the external gear.

The second transfer gear TF2 includes a second transfer drive gear TF2$a$ which is directly connected to the third rotation element N3, and a second transfer driven gear TF2$b$ which is directly connected to the fifth rotation element N5, and connects the third rotation element N3 and the fifth rotation element N5 to each other by the external gear.

The third transfer gear TF3 includes a third transfer drive gear TF3$a$ which is directly connected to the eighth rotation element N8, and a third transfer driven gear TF3$b$ which is directly connected to the sixth rotation element N6, and connects the eighth rotation element N8 and the sixth rotation element N6 to each other by the external gear.

Consequently, the respective rotation elements which are connected by the first, second, and third transfer gears TF1, TF2, and TF3 are rotated in a direction opposite to each other, and the gear ratios of the first, second, and third transfer gears TF1, TF2, and TF3 are set depending on shift ratios which are required by the respective shift stages.

A connection relationship between the friction elements C1, C2, C3, C4, B1, and B2 variably connecting the rotation elements of the first, second, and third planetary gear sets PG1, PG2, and PG3 will be described as follows.

The first clutch C1 is disposed between the input shaft IS and the first rotation element N1.

The second clutch C2 is disposed between the input shaft IS and the second rotation element N2.

The third clutch C3 is disposed between the input shaft IS and the eight rotation element N8.

The fourth clutch C4 is disposed between the fourth rotation element N4 and the fifth rotation element N5.

The first brake B1 is disposed between the fourth rotation element N4 and the transmission housing H.

The second brake B2 is disposed between the ninth rotation element N9 and the transmission housing H.

The respective friction elements including the first, second, third, and fourth clutches C1, C2, C3, and C4, and the first and second brakes B1 and B2 may include a multi-plate type hydraulic friction coupling unit which is frictionally coupled by hydraulic pressure.

FIG. 2 is an operation table for each shift stage of each friction element which is used for the planetary gear train according to some embodiments of the present invention. Referring to FIG. 2, the planetary gear train according to the first exemplary embodiment of the present invention is shifted while two friction elements are operated in each shift stage.

A forward 1-speed shift stage (1ST) is achieved by a simultaneous operation of the first and second brakes B1 and B2.

A forward 2-speed shift stage (2ND) is achieved by a simultaneous operation of the fourth clutch C4 and the second brake B2.

A forward 3-speed shift stage (3RD) is achieved by a simultaneous operation of the first clutch C1 and the second brake B2.

A forward 4-speed shift stage (4TH) is achieved by a simultaneous operation of the second clutch C2 and the second brake B2.

A forward 5-speed shift stage (5TH) is achieved by a simultaneous operation of the first and second clutches C1 and C2.

A forward 6-speed shift stage (6TH) is achieved by a simultaneous operation of the second and fourth clutches C2 and C4.

A forward 7-speed shift stage (7TH) is achieved by a simultaneous operation of the second and third clutches C2 and C3.

A forward 8-speed shift stage (8TH) is achieved by a simultaneous operation of the third and fourth clutches C3 and C4.

A forward 9-speed shift stage (9TH) is achieved by a simultaneous operation of the first and third clutches C1 and C3.

A reverse shift stage REV is achieved by a simultaneous operation of the first clutch C1 and the first brake B1.

One would appreciate that the numbers shown in FIG. 2 are exemplary and non-limiting.

A shifting process of each shift stage by the operation the above-mentioned friction elements will be described as follows.

Forward 1-Speed

In the forward 1-speed shift stage (1ST), the second rotation element N2 and the fourth rotation element N4 are fixed by the operation of the first brake B1, and the ninth rotation element N9 is fixed by the operation of the second brake B2.

As a result, since the seventh rotation element N7 is always connected to the input shaft IS and the ninth rotation element N9 is fixed, the eighth rotation element N8 is rotated in a clockwise direction, and the sixth rotation element N6 is rotated in a counterclockwise direction depending on a gear ratio of the third transfer gear TF3.

In addition, since the sixth rotation element N6 is rotated depending on the gear ratio of the third transfer gear TF3 in a state in which the fourth rotation element N4 is operated by the first brake B1 as a fixed element, the fifth rotation element N5 drives the output shaft OS while being rotated as much as a first shift ratio, thereby implementing a shift of the forward 1-speed.

Forward 2-Speed

In the forward 2-speed shift stage (2ND), if the operation of the first brake B1 is released in a state in which the operation of the second brake B2 is maintained and the four clutch C4 is fastened, in the state of the forward 1-speed, the fourth rotation element N4 which is fixed in the forward 1-speed is rotated at the same speed as the fifth rotation element N5.

Consequently, a speed of the eighth rotation element N8 is not changed due to an operation maintenance of the second brake B2 and a constant input of the seventh rotation element N7.

Therefore, the second planetary gear set PG2 is integrally rotated by the operation of the fourth clutch C4 in a state in which a rotation speed of the ninth rotation element N9 is not changed by the connection of the third transfer gear TF3, such that a speed of the fifth rotation element N5 is increased according to an increase in speed of the fourth rotation element N4, thereby implementing a shift of the forward 2-speed.

Forward 3-Speed

In the forward 3-speed shift stage (3RD), if the operation of the fourth clutch C4 is released in a state in which the operation of the second brake B2 is maintained and the first clutch C1 is fastened, in the state of the forward 2-speed, a speed of the first rotation element N1 which is rotated at a low speed in the forward 2-speed is increased to the same speed as the input shaft IS.

Consequently, since the ninth rotation element N9 is fixed due to the operation maintenance of the second brake B2 and the speed is constant according to a constant input of the seventh rotation element N7, the rotation speed of the sixth rotation element N6 is not changed by the connection of the third transfer gear TF3.

Therefore, if a speed of the third rotation element N3 is increased by the external gear connection of the first and second transfer gears TF1 and TF2, a speed of the fifth rotation element N5 connected to the output shaft OS is increased, thereby implementing a shift of the forward 3-speed.

Forward 4-Speed

In the forward 4-speed shift stage (4TH), if the operation of the first clutch C1 is released in a state in which the operation of the second brake B2 is maintained and the second clutch C2 is fastened, in the state of the forward 3-speed, a speed of the second rotation element N2 which is rotated at a speed lower than the input shaft IS in the forward 3-speed is increased to the same speed as the input shaft IS.

Consequently, since the ninth rotation element N9 is fixed due to the operation maintenance of the second brake B2 and the speed is constant according to a constant input of the seventh rotation element N7, the rotation speed of the sixth rotation element N6 is not changed by the connection of the third transfer gear TF3.

Therefore, if a speed of the third rotation element N3 is increased by the external gear connection of the first and second transfer gears TF1 and TF2, a speed of the fifth rotation element N5 connected to the output shaft OS is increased, thereby implementing a shift of the forward 4-speed.

Forward 5-Speed

In the forward 5-speed shift stage (5TH), if the operation of the second brake B2 is released in a state in which the operation of the second clutch C2 is maintained and the first clutch C1 is fastened, in the state of the forward 4-speed, a speed of the first rotation element N1 which is rotated at a speed higher than the input shaft IS in the forward 4-speed is decreased and the whole of first planetary gear set PG1 is rotated at the same speed.

Consequently, the speed of the second rotation element N2 is fixed due to the operation maintenance of the second clutch C2 and the speed of the third rotation element N3 is increased according to the decrease in speed of the first rotation element N1.

Therefore, a speed of the fifth rotation element N5 connected to the output shaft OS is increased by the external gear connection of the second transfer gear TF2, thereby implementing a shift of the forward 5-speed.

Forward 6-Speed

In the forward 6-speed shift stage (6TH), if the operation of the first clutch C1 is released in a state in which the operation of the second clutch C2 is maintained and the fourth clutch C4 is fastened, in the state of the forward 5-speed, the speed of the fifth rotation element N5 which is rotated at a speed lower than the fourth rotation element N4 in the forward 5-speed is increased and the whole of second planetary gear set PG2 is rotated at the same speed.

As such, the speed of the fifth rotation element N5 connected to the output shaft OS is increased, thereby implementing a shift of the forward 6-speed.

Forward 7-Speed

In the forward 7-speed shift stage (7TH), if the operation of the fourth clutch C4 is released in a state in which the operation of the second clutch C2 is maintained and the third clutch C3 is fastened, in the state of the forward 6-speed, the speed of the eighth rotation element N8 which is rotated at a speed lower than the input shaft IS in the forward 6-speed is increased and the whole of third planetary gear set PG3 is rotated at the same speed.

Consequently, the speed of the second rotation element N2 is fixed due to the operation maintenance of the second clutch C2 and the rotation speed of the fourth rotation element N4 is fixed by the external gear connection of the first transfer gear TF1.

Therefore, the speed of the fifth rotation element N5 connected to the output shaft OS is increased by the external gear connection of the third transfer gear TF3, thereby implementing a shift of the forward 7-speed.

Forward 8-Speed

In the forward 8-speed shift stage (8TH), if the operation of the second clutch C2 is released in a state in which the operation of the third clutch C3 is maintained and the fourth clutch C4 is fastened, in the state of the forward 7-speed, speeds of the fourth and fifth rotation elements N4 and N5 which are rotated at a speed lower than the sixth rotation element N6 in the forward 7-speed is increased and the whole of second planetary gear set PG2 is rotated at the same speed.

Consequently, the speed of the second rotation element N2 is fixed due to the operation maintenance of the second clutch C2 and the rotation speed of the fourth rotation element N4 is fixed by the external gear connection of the first transfer gear TF1.

Therefore, the speed of the fifth rotation element N5 connected to the output shaft OS is increased, thereby implementing a shift of the forward 8-speed.

Forward 9-Speed

In the forward 9-speed shift stage (9TH), if the operation of the fourth clutch C4 is released in a state in which the operation of the third clutch C3 is maintained and the first clutch C1 is fastened, in the state of the forward 8-speed, the speed of the first rotation element N1 which is rotated at a lower speed in the forward 8-speed is increased in a clockwise direction, and the speed of the fifth rotation element N5 connected to the output shaft OS is increased by the external gear connection of the first and second transfer gears TF1 and TF2, thereby implementing a shift of the forward 9-speed.

Reverse

In the reverse shift stage REV, if the second rotation element N2 is fixed by the operation of the first brake B1 and the first clutch C1 is operated, the first rotation element N1 rotates the third rotation element N3 in the counterclockwise direction while being rotated in the clockwise direction.

In addition, the fifth rotation element N5 connected to the output shaft OS is rotated in the clockwise direction, thereby implementing a reverse shift.

In the planetary gear train according to the first exemplary embodiment of the present invention as described above, it is possible to provide a planetary gear train of an automatic transmission for vehicles capable of reducing a whole length to improve mounting property and improving power transfer performance to reduce fuel costs by implementing the forward 9-speed and reverse 1-speed shift stages having an excellent operation condition of the friction element by a combination of the three planetary gear sets PG1, PG2, and PG3, the three transfer gears TF1, TF2, and TF3, and the six friction elements C1, C2, C3, C4, B1, and B2 which are distributively disposed on the input shaft IS and the output shaft OS having the predetermined distance therebetween and disposed in parallel with each other.

In addition, it is possible to provide a planetary gear train of an automatic transmission for vehicles capable of setting an optimal gear ratio by applying the three transfer gears TF1, TF2, and TF3 to freely change the number of teeth of a gear and consequently, improving power transfer performance and fuel efficiency.

In addition, the shift control may be easily performed by operating the two friction elements in each shift stage.

Figure 3:
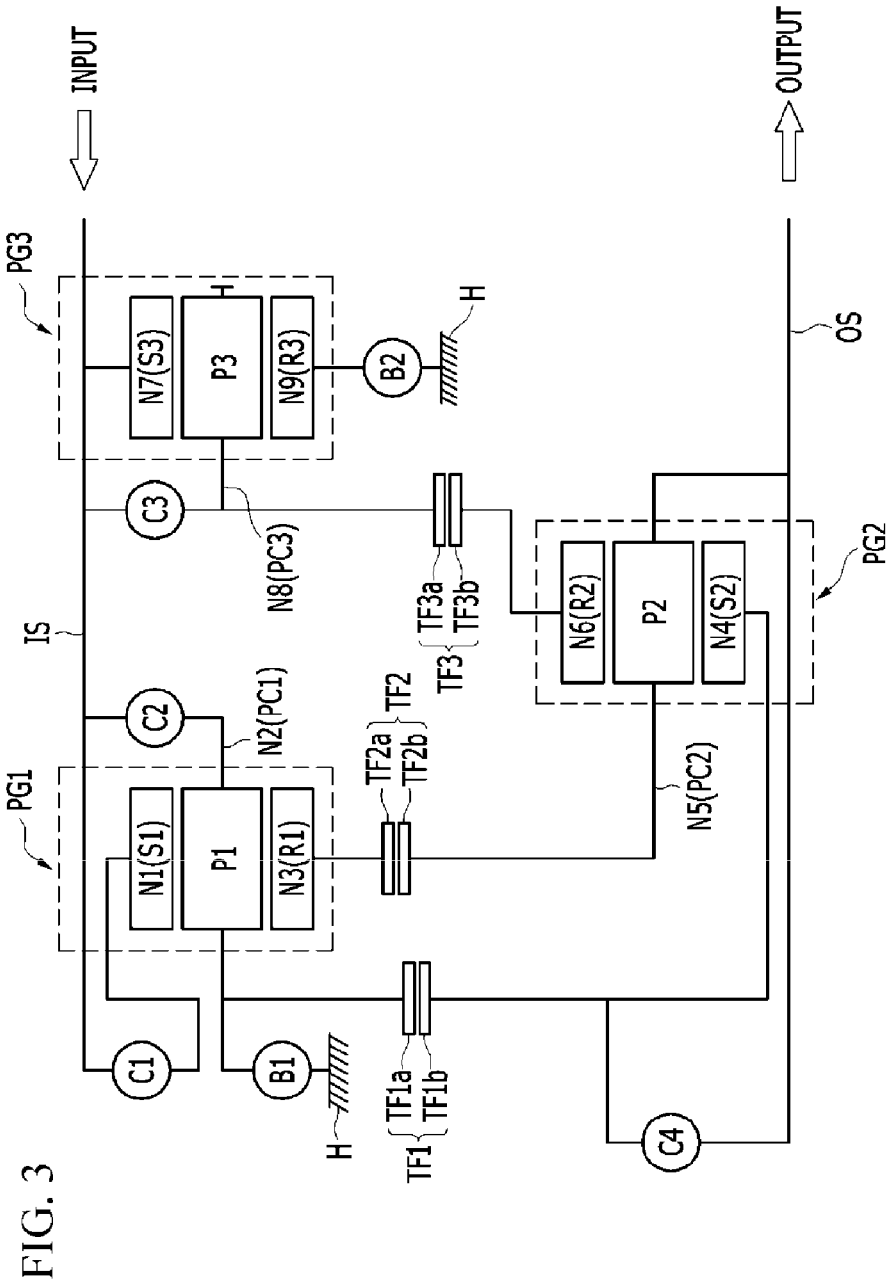
FIG. 3 is a schematic diagram of a second exemplary planetary gear train according to the present invention.

FIG. 3 is a schematic diagram of a planetary gear train according to a second exemplary embodiment of the present invention. Referring to FIG. 3, whereas the first exemplary embodiment shows the case in which the first brake B1 acting as the friction element for fixing the second rotation element N2 and the fourth rotation element N4 is disposed between the fourth rotation element N4 and the transmission housing H, the second exemplary embodiment shows a case in which the first brake B1 is disposed between the second rotation element N2 and the transmission housing H.

Since the second exemplary embodiment has the same operation effect as the first exemplary embodiment except for the disposed position of the first brake B1 as compared to the first exemplary embodiment, a detailed description thereof will be omitted.

Figure 4:
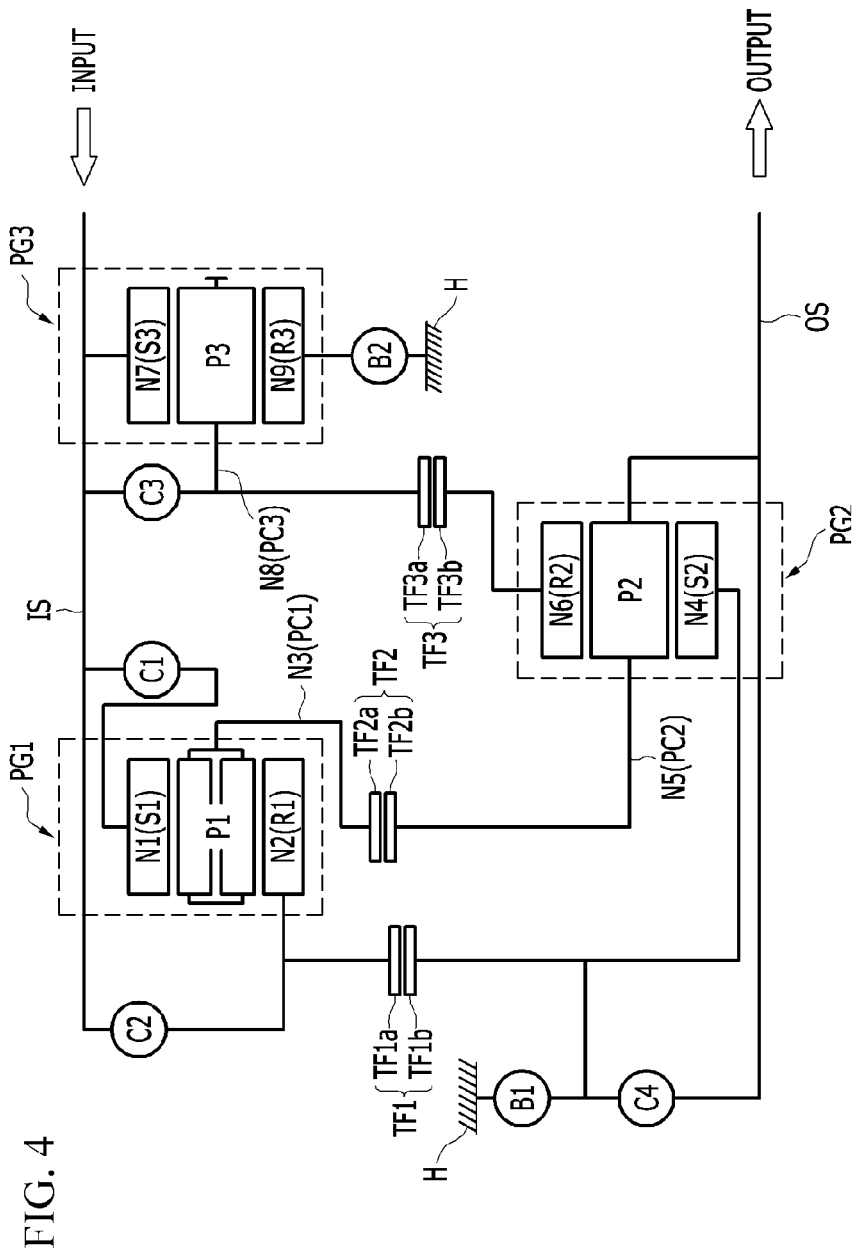
FIG. 4 is a schematic diagram of a third exemplary planetary gear train according to the present invention.

FIG. 4 is a schematic diagram of a planetary gear train according to a third exemplary embodiment of the present invention. Referring to FIG. 4, whereas the first exemplary embodiment shows a case in which the first planetary gear set PG1 is configured by a single pinion planetary gear set, the third exemplary embodiment shows a case in which the first planetary gear set PG1 is configured by a double pinion planetary gear set.

Therefore, the first rotation element N1 associated with the first planetary gear set PG1 includes the first sun gear S1 and the second rotation element N2 includes the first ring gear R1 to be connected to the second planetary carrier PC2 by the external gear, and the third rotation element N3 includes the first planetary carrier PC1.

Since the third exemplary embodiment has the same operation effect as the first exemplary embodiment except for the configuration of the second and third rotation elements N2 and N3 as compared to the first exemplary embodiment, a detailed description thereof will be omitted.

Figure 5:
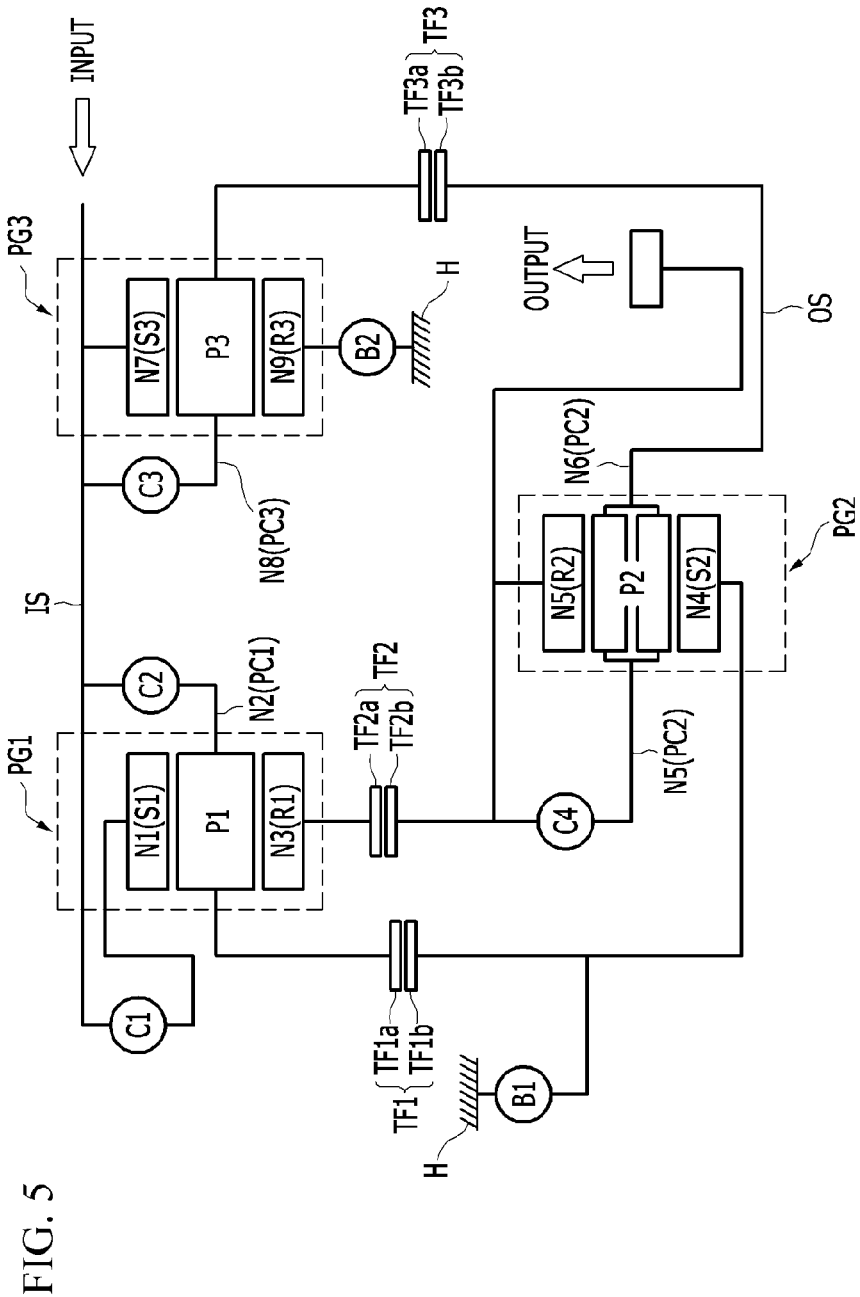
FIG. 5 is a schematic diagram of a fourth exemplary planetary gear train according to the present invention.

FIG. 5 is a schematic diagram of a planetary gear train according to a fourth exemplary embodiment of the present invention. Referring to FIG. 5, whereas the first exemplary embodiment shows a case in which the second planetary gear set PG2 is configured by the single pinion planetary gear set, the fourth exemplary embodiment shows a case in which the second planetary gear set PG2 is configured by the double pinion planetary gear set.

Therefore, the fourth rotation element N4 associated with the second planetary gear set PG2 includes the second sun gear S2, the fifth rotation element N5 includes the second ring gear R2, and the sixth rotation element N6 includes the second planetary carrier PC2.

Since the fourth exemplary embodiment has the same operation effect as the first exemplary embodiment except for the configuration of the fifth and sixth rotation elements N5 and N6 as compared to the first exemplary embodiment, a detailed description thereof will be omitted.

Figure 6:
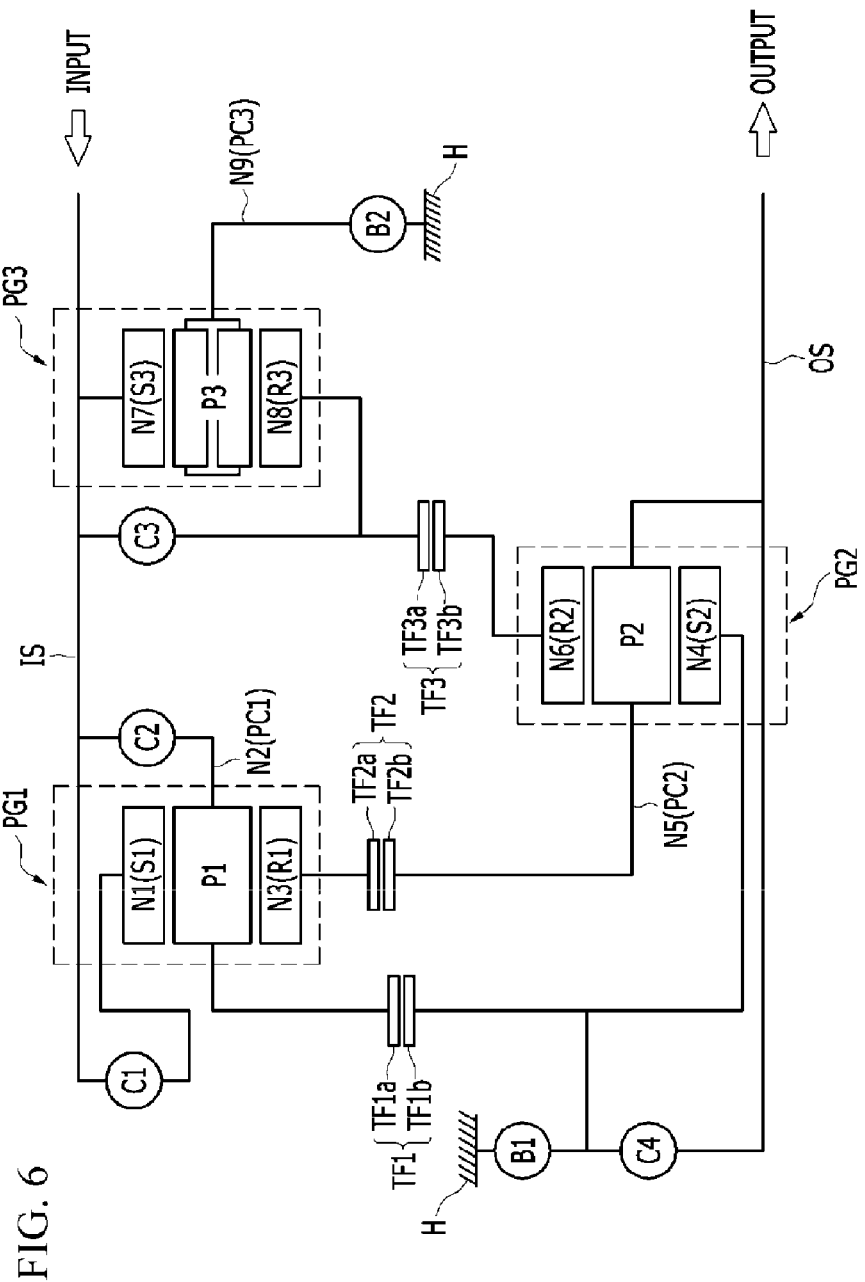
FIG. 6 is a schematic diagram of a fifth exemplary planetary gear train according to the present invention.

FIG. 6 is a schematic diagram of a planetary gear train according to a fifth exemplary embodiment of the present invention. Referring to FIG. 6, whereas the first exemplary embodiment shows a case in which the third planetary gear set PG3 is configured by the single pinion planetary gear set, the fifth exemplary embodiment shows a case in which the third planetary gear set PG3 is configured by the double pinion planetary gear set.

Therefore, the seventh rotation element N7 associated with the third planetary gear set PG3 includes the third sun gear S3, the eighth rotation element N8 includes the third ring gear R3, and the ninth rotation element N9 includes the third planetary carrier PC3.

Since the fifth exemplary embodiment has the same operation effect as the first exemplary embodiment except for the configuration of the eighth and ninth rotation elements N8 and N9 as compared to the first exemplary embodiment, a detailed description thereof will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
    an input shaft receiving power of an engine;
    an output shaft disposed substantially in parallel with the input shaft;
    a first planetary gear set having three rotation elements including a first sun gear, a first planetary carrier, and a first ring gear, and disposed on the input shaft;
    a second planetary gear set having three rotation elements including a second sun gear, a second planetary carrier, and a second ring gear, and disposed on the output shaft;
    a third planetary gear set having three rotation elements including a third sun gear, a third planetary carrier, and a third ring gear, and disposed on the input shaft;
    first, second, and third transfer gears; and
    six friction elements, wherein:
        a first rotation element, selectively connected to the input shaft, is a first rotation element of the first planetary gear set;
        a second rotation element, selectively connected to the input shaft, is a second rotation element of the first planetary gear set;
        a third rotation element is a third rotation element of the first planetary gear set;
        a fourth rotation element, connected to the second rotation element by the first transfer gear and selectively connected to a transmission housing, is a first rotation element of the second planetary gear set;
        a fifth rotation element, connected to the third rotation element by the second transfer gear and directly connected to the output shaft, and selectively connected to the fourth rotation element, is a second rotation element of the second planetary gear set;
        a sixth rotation element is a third rotation element of the second planetary gear set;
        a seventh rotation element, directly connected to the input shaft, is a first rotation element of the third planetary gear set;
        an eighth rotation element, selectively connected to the input shaft and connected to the sixth rotation element by the third transfer gear is a second rotation element of the third planetary gear set;
        a ninth rotation element, selectively connected to the transmission housing, is a third rotation element of the third planetary gear set;
        and
        a friction element of the six friction elements selectively connects two corresponding rotation elements to each other or selectively connects a corresponding rotation element to the transmission housing.

2. The planetary gear train of claim 1, wherein each of the first, second, and third planetary gear sets is a single pinion planetary gear set, the first rotation element includes the first sun gear, the second rotation element includes the first planetary carrier, the third rotation element includes the first ring gear, the fourth rotation element includes the second sun gear, the fifth rotation element includes the second planetary carrier, the sixth rotation element includes the second ring gear, the seventh rotation element includes the third sun gear, the eighth rotation element includes the third planetary carrier, and the ninth rotation element includes the third ring gear.

3. The planetary gear train of claim 1, wherein the six friction elements include:
    a first clutch disposed between the input shaft and the first rotation element;
    a second clutch disposed between the input shaft and the second rotation element;
    a third clutch disposed between the input shaft and the eighth rotation element;
    a fourth clutch disposed between the fourth rotation element and the fifth rotation element;
    a first brake disposed between the fourth rotation element and the transmission housing; and
    a second brake disposed between the ninth rotation element and the transmission housing.

4. The planetary gear train of claim 1, wherein the first planetary gear set is a double pinion planetary gear set, each of the second and third planetary gear sets is a single pinion planetary gear set, the first rotation element includes the first sun gear, the second rotation element includes the first ring gear, the third rotation element includes the first planetary carrier, the fourth rotation element includes the second sun gear, the fifth rotation element includes the second planetary carrier, the sixth rotation element includes the second ring gear, the seventh rotation element includes the third sun gear, the eighth rotation element includes the third planetary carrier, and the ninth rotation element includes the third ring gear.

5. The planetary gear train of claim 1, wherein each of the first and third planetary gear sets is a single pinion planetary gear set, the second planetary gear set is a double pinion planetary gear set, the first rotation element includes the first sun gear, the second rotation element includes the first planetary carrier, the third rotation element includes the first ring gear, the fourth rotation element includes the second sun gear, the fifth rotation element includes the second ring gear, the sixth rotation element includes the second planetary carrier, the seventh rotation element includes the third sun gear, the eighth rotation element includes the third planetary carrier, and the ninth rotation element includes the third ring gear.

6. The planetary gear train of claim 1, wherein each of the first and second planetary gear sets is a single pinion planetary gear set, the third planetary gear set is a double pinion planetary gear set, the first rotation element includes the first sun gear, the second rotation element includes the first planetary carrier, the third rotation element includes the first ring gear, the fourth rotation element includes the second sun gear, the fifth rotation element includes the second planetary carrier, the sixth rotation element includes the second ring gear, the seventh rotation element includes the third sun gear, the eighth rotation element includes the third ring gear, and the ninth rotation element includes the third planetary carrier.

7. The planetary gear train of claim 1, wherein the six friction elements include:
 a first clutch disposed between the input shaft and the first rotation element;
 a second clutch disposed between the input shaft and the second rotation element;
 a third clutch disposed between the input shaft and the eighth rotation element;
 a fourth clutch disposed between the fourth rotation element and the fifth rotation element;
 a first brake disposed between the second rotation element and the transmission housing; and
 a second brake disposed between the ninth rotation element and the transmission housing.

8. A planetary gear train of an automatic transmission for a vehicle, the planetary gear train comprising:
 an input shaft receiving power of an engine;
 an output shaft disposed substantially in parallel with the input shaft;
 a first planetary gear set, disposed on the input shaft, the first planetary gear set being a single pinion planetary gear set having three rotation elements including a first sun gear, a first planetary carrier, and a first ring gear;
 a second planetary gear set, disposed on the output shaft, the second planetary gear set being a single pinion planetary gear set having three rotation elements including a second sun gear, a second planetary carrier, and a second ring gear;
 a third planetary gear set, disposed on the input shaft, the third planetary gear set being a single pinion planetary gear set having three rotation elements including a third sun gear, a third planetary carrier, and a third ring gear;
 first, second, and third transfer gears; and
 six friction elements, wherein:
  a first rotation element, including the first sun gear, is selectively connected to the input shaft;
  a second rotation element, including the first planetary carrier, is selectively connected to the input shaft;
  a third rotation element includes the first ring gear;
  a fourth rotation element, including the second sun gear, is connected to the second rotation element by the first transfer gear and selectively connected to a transmission housing;
  a fifth rotation element, including the second planetary carrier, is connected to the third rotation element by the second transfer gear and directly connected to the output shaft, and selectively connected to the fourth rotation element;
  a sixth rotation element includes the second ring gear;
  a seventh rotation element, including the third sun gear, is directly connected to the input shaft;
  an eighth rotation element, including the third planetary carrier, is selectively connected to the input shaft and connected to the sixth rotation element by the third transfer gear;
  a ninth rotation element, including the third ring gear, is selectively connected to the transmission housing; and
  a friction element of the six friction elements selectively connects two corresponding rotation elements to each other or selectively connects a corresponding rotation element to the transmission housing.

9. The planetary gear train of claim 8, wherein the six friction elements include:
 a first clutch disposed between the input shaft and the first rotation element;
 a second clutch disposed between the input shaft and the second rotation element;
 a third clutch disposed between the input shaft and the eighth rotation element;
 a fourth clutch disposed between the fourth rotation element and the fifth rotation element;
 a first brake disposed between the fourth rotation element and the transmission housing; and
 a second brake disposed between the ninth rotation element and the transmission housing.

10. A planetary gear train of an automatic transmission for a vehicle, the planetary gear train comprising:
 an input shaft receiving power of an engine;
 an output shaft disposed substantially in parallel with the input shaft;
 a first planetary gear set, disposed on the input shaft, is a double pinion planetary gear set having three rotation elements including a first sun gear, a first planetary carrier, and a first ring gear;
 a second planetary gear set, disposed on the output shaft, is a single pinion planetary gear set having three rotation elements including a second sun gear, a second planetary carrier, and a second ring gear;
 a third planetary gear set, disposed on the input shaft, is a single pinion planetary gear set having three rotation elements including a third sun gear, a third planetary carrier, and a third ring gear;
 first, second, and third transfer gears; and
 six friction elements, wherein:
  a first rotation element, including the first sun gear, is selectively connected to the input shaft;
  a second rotation element, including the first ring gear, is selectively connected to the input shaft;
  a third rotation element includes the first planetary carrier;
  a fourth rotation element, including the second sun gear, is connected to the second rotation element by the first transfer gear and selectively connected to a transmission housing;
  a fifth rotation element, including the second planetary carrier, is connected to the third rotation element by the second transfer gear and directly connected to the output shaft, and selectively connected to the fourth rotation element;
  a sixth rotation element includes the second ring gear;

a seventh rotation element, including the third sun gear, is directly connected to the input shaft;

an eighth rotation element, including the third planetary carrier, is selectively connected to the input shaft and connected to the sixth rotation element by the third transfer gear;

a ninth rotation element, including the third ring gear, is selectively connected to the transmission housing; and a friction element of the six friction elements selectively connects two corresponding rotation elements to each other or selectively connects a corresponding rotation element to the transmission housing.

11. The planetary gear train of claim 10, wherein the six friction elements include:

a first clutch disposed between the input shaft and the first rotation element;

a second clutch disposed between the input shaft and the second rotation element;

a third clutch disposed between the input shaft and the eighth rotation element;

a fourth clutch disposed between the fourth rotation element and the fifth rotation element;

a first brake disposed between the fourth rotation element and the transmission housing; and a second brake disposed between the ninth rotation element and the transmission housing.

* * * * *